US012801051B2

(12) United States Patent
Takemori

(10) Patent No.: US 12,801,051 B2
(45) Date of Patent: Nov. 17, 2026

(54) TONER AND TONER PRODUCTION METHOD

(71) Applicant: KYOCERA Document Solutions Inc., Osaka (JP)

(72) Inventor: Toshiki Takemori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 407 days.

(21) Appl. No.: 18/598,653

(22) Filed: Mar. 7, 2024

(65) Prior Publication Data

US 2024/0302760 A1 Sep. 12, 2024

(30) Foreign Application Priority Data

Mar. 9, 2023 (JP) ................................ 2023-036531

(51) Int. Cl.
*G03G 9/097* (2006.01)
*G03G 9/08* (2006.01)

(52) U.S. Cl.
CPC ....... *G03G 9/09708* (2013.01); *G03G 9/0819* (2013.01)

(58) Field of Classification Search
CPC ......................... G03G 9/09708; G03G 9/0819
See application file for complete search history.

(56) References Cited

U.S. PATENT DOCUMENTS

2008/0292983 A1* 11/2008 Mizuhata ............... G03G 13/08 430/108.6

FOREIGN PATENT DOCUMENTS

JP H04-000452 A 1/1992
JP 2020129031 A * 8/2020

OTHER PUBLICATIONS

English machine translation of the description of JP-2020129031-A (Year: 2020).*

* cited by examiner

*Primary Examiner* — Boone Alexander Evans
(74) *Attorney, Agent, or Firm* — Studebaker Brackett PLLC

(57) ABSTRACT

A toner contains toner particles. The toner particles each include a toner mother particle and an external additive attached to the surface of the toner mother particle. The external additive contains specific external additive particles. The specific external additive particles each include an aluminum oxide particle and a coat layer covering the surface of the aluminum oxide particle. The coat layers contain antimony tin oxide particles. The specific external additive particles have a powder specific resistance of no greater than 100 Ω·cm. The specific external additive particles have a volume median diameter of 100 nm to 550 nm. The specific external additive particles have surfaces with an arithmetic mean roughness Ra of 8 nm to 45 nm. The specific external additive particles have a content of 0.3 parts by mass to 4.0 parts by mass relative to 100 parts by mass of the toner mother particles.

7 Claims, 2 Drawing Sheets

TONER AND TONER PRODUCTION METHOD

INCORPORATION BY REFERENCE

The present application claims priority under 35 U.S.C. § 119 to Japanese Patent Application No. 2023-036531, filed on Mar. 9, 2023. The contents of this application are incorporated herein by reference in their entirety.

BACKGROUND

The present disclosure relates to a toner and a toner production method.

In electrophotographic image formation, toners are used that contain toner particles. The toner particles each include a toner mother particle containing a binder resin and the like, for example. A toner containing such toner particles is used as a one-component developer, for example.

The toner used as a one-component developer is required to have excellent developability and to be able to form images with desired image density and inhibit occurrence of fogging. To meet such requirements, a toner is proposed that contains titanium oxide treated with fatty acid metal salt, for example.

SUMMARY

A toner according to an aspect of the present disclosure contains toner particles. The toner particles each include a toner mother particle and an external additive attached to a surface of the toner mother particle. The external additive contains specific external additive particles. The specific external additive particles each include an aluminum oxide particle and a coat layer covering a surface of the aluminum oxide particle. The coat layers contain antimony tin oxide particles. The specific external additive particles have a powder specific resistance of no greater than 100 Ω·cm. The specific external additive particles have a volume median diameter of at least 100 nm and no greater than 550 nm. The specific external additive particles have surfaces with an arithmetic mean roughness Ra of at least 8 nm and no greater than 45 nm. The specific external additive particles have a content of at least 0.3 parts by mass and no greater than 4.0 parts by mass relative to 100 parts by mass of the toner mother particles.

A toner production method according to an aspect of the present disclosure is a method for producing a toner containing toner particles each including a toner mother particle and an external additive attached to a surface of the toner mother particle, and includes: preparing specific external additive particles; and externally adding the external additive to the toner mother particles. The specific external additive particles each include an aluminum oxide particle and a coat layer covering a surface of the aluminum oxide particle. The coat layers contain antimony tin oxide particles. In the preparing specific external additive particles, the coat layers are formed by precipitating the antimony tin oxide particles on the surfaces of the aluminum oxide particles in a reaction solution. The reaction solution contains a basic ammonium salt. The reaction solution has a pH of at least 4.2 and no greater than 5.8.

DETAILED DESCRIPTION

Figure 1:
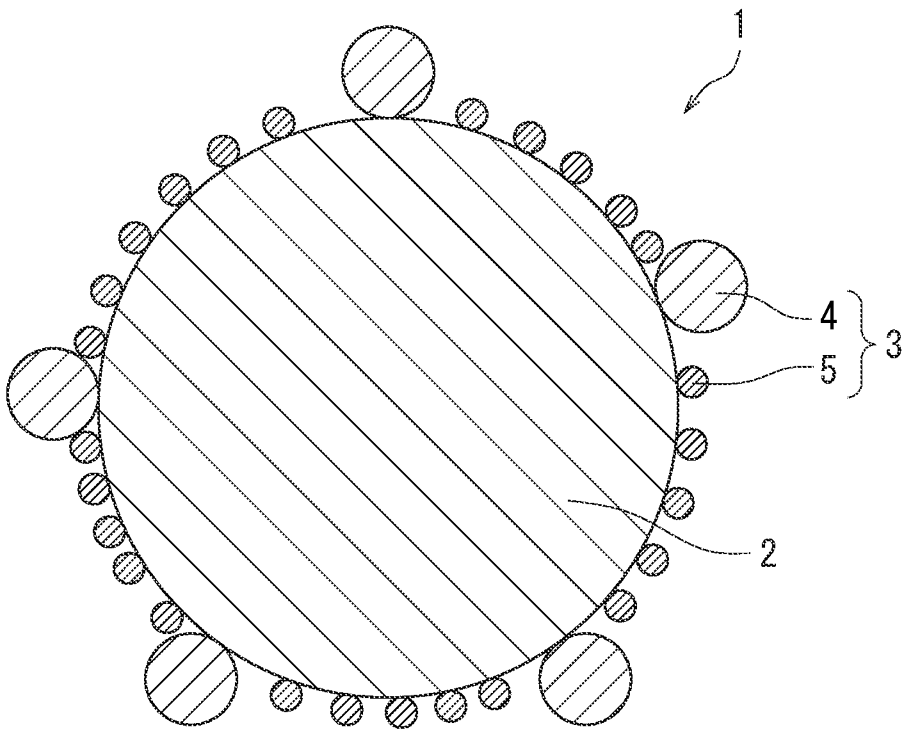
FIG. 1 is a diagram illustrating an example of a toner particle.

The following describes preferred embodiments of the present disclosure. Note that a toner is a collection (e.g., a powder) of toner particles. An external additive is a collection (e.g., a powder) of external additive particles. Unless otherwise stated, evaluation results (e.g., values indicating shape or physical properties) for a powder (specific examples include a powder of toner particles, a powder of external additive particles, and a magnetic powder) are number averages of values as measured for a suitable number of particles selected from the powder.

Measurement values for volume median diameter ($D_{50}$) of a powder are values as measured using a laser diffraction/scattering type particle size distribution analyzer (e.g., "LA-920V2" produced by HORIBA, Ltd. or "COULTER COUNTER MULTISIZER 3" produced by Beckman Coulter, Inc.) unless otherwise stated.

Unless otherwise stated, the number average particle diameter of a powder is a number average value of equivalent circle diameters (Heywood diameters: diameters of circles having the same areas as projected areas of the primary particles) of primary particles of the powder as measured using a scanning electron microscope. The number average primary particle diameter is a number average value of equivalent circle diameters of 100 primary particles, for example. Note that the number average primary particle diameter of particles refers to a number average primary particle diameter of the particles of a powder unless otherwise stated.

Chargeability refers to chargeability in triboelectric charging unless otherwise stated. For example, a measurement target (e.g., a toner) is triboelectrically charged by mixing and stirring the measurement target with a standard carrier (standard carrier for use with negatively chargeable toner: N-01, standard carrier for use with positively chargeable toner: P-01) provided by The Imaging Society of Japan. The amount of charge of the measurement target is measured using for example a compact suction-type charge measuring device ("MODEL 212HS", product of TREK, INC.) before and after triboelectric charging. A larger change in charge of amount between before and after triboelectric charging indicates stronger chargeability of the measurement target.

The softening point (Tm) is a value as measured using a capillary rheometer ("CFT-500D", product of Shimadzu Corporation) unless otherwise stated. On an S-shaped curve (vertical axis: temperature, horizontal axis: stroke) measured using the capillary rheometer, the softening point (Tm) corresponds to a temperature corresponding to a stroke value of "(base line stroke value+maximum stroke value)/2".

The "main component" of a material means a component most abundant in the material in terms of mass unless otherwise stated.

In the following description, the term "-based" may be appended to the name of a chemical compound to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof.

First Embodiment: Toner

A toner according to a first embodiment of the present disclosure contains toner particles. The toner particles each include a toner mother particle and an external additive attached to the surface of the toner mother particle. The external additive contains specific external additive particles. The specific external additive particles each include an aluminum oxide particle and a coat layer covering a surface of the aluminum oxide particle. The coat layers contain antimony tin oxide particles. The specific external additive particles have a powder specific resistance of no greater than 100 Ω·cm. The specific external additive particles have a volume median diameter of at least 100 nm and no greater than 550 nm. The specific external additive particles have surfaces with an arithmetic mean roughness Ra of at least 8 nm and no greater than 45 nm. The specific external additive particles have a content of at least 0.3 parts by mass and no greater than 4.0 parts by mass relative to 100 parts by mass of the toner mother particles.

The toner of the present disclosure can be favorably used for example as a positively chargeable one-component developer (specifically, a magnetic one-component magnetic developer or a non-magnetic one-component developer) for electrostatic latent image development. Details of the toner of the present disclosure are described below with reference to the drawings as appropriate.

[Toner Particles]

FIG. 1 illustrates an example of a toner particle 1 contained in the toner. The toner particle 1 illustrated in FIG. 1 includes a toner mother particle 2 and an external additive 3 attached to the surface of the toner mother particle 2. The external additive 3 contains specific external additive particles 4 and silica particles 5.

Figure 2:
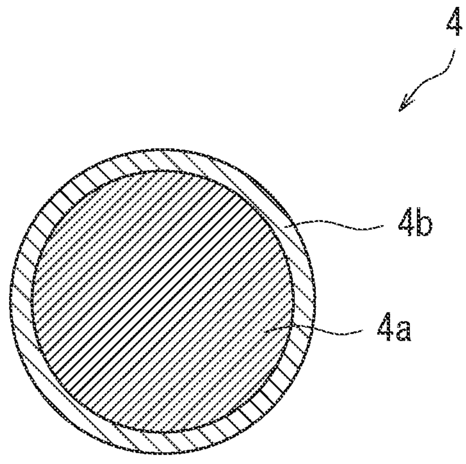
FIG. 2 is a diagram illustrating an example of a specific external additive particle.

FIG. 2 illustrates an example of a specific external additive particle 4. The specific external additive particle 4 includes an aluminum oxide particle 4*a* and a coat layer 4*b* covering the surface of the aluminum oxide particle 4*a*.

Figure 3:
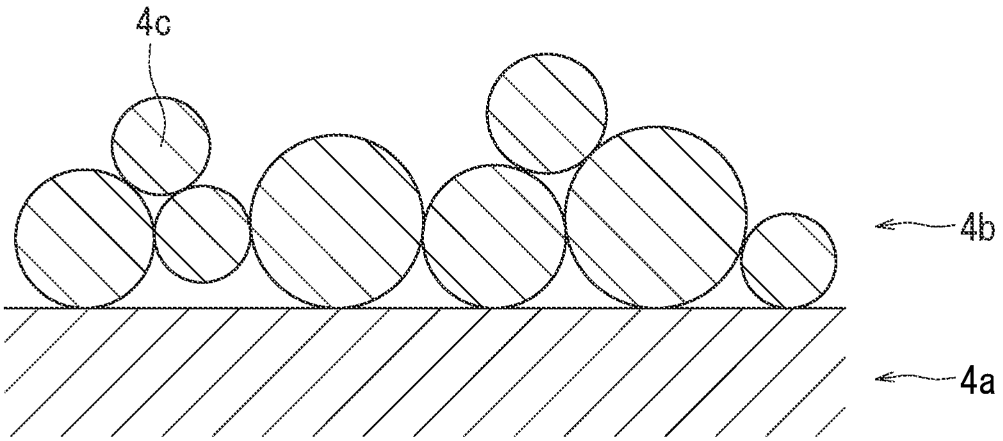
FIG. 3 is an enlarged view of a coat layer of the specific external additive particle.

FIG. 3 is an enlarged view of the coat layer 4*b* of the specific external additive particle 4. The coat layer 4*b* contains only antimony tin oxide particles. The coat layer 4*b* has a moderately irregular surface due to the fact that it is a layer constituted by particles.

The toner particle 1 as an example of the toner particles has been described so far with reference to FIGS. 1 to 3 as examples. However, the toner particles contained in the toner of the present disclosure may have structure different from that of the toner particle 1 illustrated in FIGS. 1 to 3. Specifically, the external additive of the toner of the present disclosure may contain only the specific external additive particles or may further contain external additive particles (also referred to below as optional external additive particles) besides the specific external additive particles and the silica particles. Alternatively, the coat layers may further contain an optional component besides the antimony tin oxide particles. The toner particles may be toner particles (also referred to below as capsule toner particles) including shell layers. The capsule toner particles each include a toner mother particle including a toner core containing a binder resin and a shell layer covering the surface of the toner core, for example.

As a result of having the above features, the toner of the present disclosure has excellent developability and can form images with desired image density and inhibit occurrence of fogging. Note that the "developability of a toner" is evaluated by how uniformly the toner, when used as a one-component developer, can form a thin toner layer on the surface of a toner bearing member (e.g., a development roller or a development sleeve) included in an image forming apparatus, for example. Developability of a toner is particularly important when a new toner bearing member is used for the first time (in toner installation operation) in an image forming apparatus that uses a one-component developer. Nothing is attached to the surface of the new toner bearing member. However, once the toner bearing member is used, the external additive contained in the toner particles attaches to the surface of the toner bearing member and the amount of the external additive that attaches to the surface of the toner bearing member increases as the toner bearing member is used. When the external additive attaches to the surface of the toner bearing member, the friction coefficient of the surface of the toner bearing member decreases. That is, the surface of the new toner bearing member has a higher friction coefficient than that of a toner bearing member used to some extent. A toner bearing member having a surface with a high friction coefficient easily charge toner particles borne thereby excessively. From the above, excessively charged toner particles are generated in toner installation operation, easily causing turbulence of toner thin layers. By contrast, the toner of the present disclosure, which has excellent developability, can inhibit turbulence of toner thin layers even in toner installation operation.

Reasons why the toner of the present disclosure can provide the above advantages can be inferred as follows. The toner of the present disclosure contains the specific external additive particles. Even if the toner particles are excessively charged, the specific external additive particles, which have a low powder specific resistance, can release charge to another member (e.g., other toner particles or a toner bearing member). Furthermore, the specific external additive particles reduce frictional resistance of the toner particles to inhibit attachment between the toner particles and the toner bearing member and attachment between the toner particles. Thus, the specific external additive particles impart excellent fluidity to the toner of the present disclosure. In the toner of the present disclosure, the specific external additive particles have an appropriate volume median diameter and have an appropriate content. Therefore, it can be ensured that the toner of the present disclosure has an advantage of the specific external additive particles for releasing excess charge and an advantage of the specific external additive particles for imparting fluidity to the toner of the present disclosure. Furthermore, toner particles of known toners gather closely when a toner thin layer is formed on the surface of the toner bearing member. In gathering, external additive particles contained in the toner particles are pressed against toner mother particles by pressure from the surroundings to adhere to the toner mother particles strongly. It is difficult for the external additive particles strongly adhering to the toner mother particles to impart sufficient fluidity to the known toners. From the reasons as above, known toners tend to lose fluidity when forming a toner thin layer, leading to occurrence of turbulence of toner thin layers. By contrast, the surfaces of the specific external additive particles are moderately rough in the toner of the present disclosure. Therefore, the specific external additive particles have an appropriately small contact area with the toner mother particles and do not adhere strongly to the toner mother particles even when pressed against the toner mother particles. As a result, the specific external additive particles can maintain fluidity of the toner of the present disclosure even when the toner of the present disclosure forms a toner thin layer. Thus, the toner of the present disclosure can effectively inhibit turbulence of toner thin layers. As a result, the toner of the present disclosure has excellent developability and can form images with desired image density and inhibit occurrence of fogging.

Details of the toner of the present disclosure are further described below. Note that one type of each component described in the present specification may be used independently, or two or more types of the component may be used in combination.

(External Additive)

The external additive attaches to the surface of the toner mother particles. The external additive contains specific external additive particles. Preferably, the external additive further contains silica particles.

(Specific External Additive Particles)

The specific external additive particles each include an aluminum oxide particle and a coat layer covering the surface of the aluminum oxide particle. The specific external additive particles have a powder specific resistance of no greater than 100 Ω·cm, and preferably at least 10 Ω·cm and no greater than 30 Ω·cm. As a result of the powder specific resistance of the specific external additive particles being set to no greater than 100 Ω·cm, excessive charge of the toner particles can be inhibited. Note that the powder specific resistance of the specific external additive particles is a value as measured by the method described in Example or a method in accordance therewith.

The surfaces of the specific external additive particles have an arithmetic mean roughness Ra of at least 8 nm and no greater than 45 nm, and preferably at least 18 nm and no greater than 32 nm. As a result of the arithmetic mean roughness Ra of the surfaces of the specific external additive particles being set to at least 8 nm, the contact area between the specific external additive particles and the toner mother particles can be appropriately reduced. Excellent developability can be accordingly imparted to the toner of the present disclosure. As a result of the arithmetic mean roughness Ra of the surfaces of the specific external additive particles being set to no greater than 45 nm, a certain attachment force between the specific external additive particles and the toner mother particles can be ensured. Thus, detachment of the specific external additive particles from the toner mother particles can be inhibited. Note that the arithmetic mean roughness Ra of the surfaces of the specific external additive particles is a value as measured in accordance with JIS-B0601:1994.

The specific external additive particles have a volume median diameter of at least 100 nm and no greater than 550 nm, and preferably at least 350 nm and no greater than 460 nm. As a result of the volume median diameter of the specific external additive particles being set to at least 100 nm, sufficient fluidity can be imparted to the toner of the present disclosure. As a result of the volume median diameter of the specific external additive particles being set to no greater than 550 nm, detachment of the specific external additive particles from the toner mother particles can be inhibited.

The specific external additive particles have a detachment rate of preferably at least 8% and no greater than 55%, and more preferably at least 10% and no greater than 20%. As a result of the detachment rate of the specific external additive particles being set to at least 8%, further excellent fluidity can be imparted to the toner of the present disclosure. As a result of the detachment rate of the specific external additive particles being set to no greater than 55%, an advantage of the specific external additive particle for releasing excessive charge and an advantage of the specific external additive particle for imparting fluidity to the toner of the present disclosure can be easily exhibited.

Description is made herein of a method for measuring the detachment rate of the specific external additive particles. First, a toner dispersion is prepared that contains 0.2 g of a nonionic surfactant, 80.0 g of ion exchange water, and 20.0 g of the toner of the present disclosure. Next, ultrasonication for applying ultrasonic oscillation at a frequency of 28 kHz and an output power of 100 W is carried out on the toner dispersion for 5 minutes. Fluorescent X-ray analysis is then carried out to measure a peak intensity $X_A$ of an aluminum element contained in a measurement target after ultrasonication and a peak intensity $X_B$ of an aluminum element contained in the measurement target before ultrasonication. When the obtained measurement values are adopted to "detachment rate$=100\times(X_B-X_A)/X_B$", the detachment rate of the specific external additive particles can be calculated.

The specific external additive particles in the toner particles have a content of at least 0.3 parts by mass and no greater than 4.0 parts by mass relative to 100 parts by mass of the toner mother particles, and preferably at least 0.7 parts by mass and no greater than 1.5 parts by mass. As a result of the content of the specific external additive particles being set to at least 0.3 parts by mass, excellent fluidity can be imparted to the toner of the present disclosure. As a result of the content of the specific external additive particles being set to no greater than 4.0 parts by mass, detachment of the specific external additive particle from the toner mother particles can be inhibited.

(Aluminum Oxide Particles)

The aluminum oxide particles contain aluminum oxide (alumina). The aluminum oxide particles serve as cores of the specific external additive particles. The aluminum oxide has a percentage content in the aluminum oxide particles of preferably at least 90% by mass, and more preferably 100% by mass. Preferably, the percentage content of the mass of the aluminum oxide particles to the mass of the specific external additive particles is at least 75% by mass and no greater than 95% by mass.

(Coat Layers)

The coat layers contain antimony tin oxide particles. Since the coat layers are layers containing the antimony tin oxide particles rather than layers uniform in thickness, the surfaces of the specific external additive particles have appropriate roughness. The specific external additive particles, which include the coat layers containing the antimony tin oxide particles excellent in conductivity, can have appropriate conductivity.

The antimony tin oxide particles have a percentage content in the coat layers of preferably at least 90% by mass, and more preferably 100% by mass. The thickness (average thickness measured at 20 randomly selected locations) of the coat layers is at least 10 nm and no greater than 100 nm, for example. The antimony tin oxide particles have a number average primary particle diameter of at least 3 nm and no greater than 30 nm, for example.

(Silica Particles)

Silica particles with surface treatment to impart positive chargeability are preferable as the silica particles. The silica particles have a number average primary particle diameter of preferably at least 15 nm and no greater than 300 nm, more preferably at least 15 nm and no greater than 100 nm, and further preferably at least 15 nm and no greater than 40 nm. As a result of the number average primary particle diameter of the silica particles being set to at least 15 nm, the silica particles can be inhibited from being buried in the toner mother particles. As a result of the number average primary particle diameter of the silica particles being set to no greater than 300 nm by contrast, detachment of the silica particles from the toner mother particles can be inhibited.

In terms of allowing the silica particles to sufficiently exhibiting their function while inhibiting detachment thereof from the toner mother particles, the silica particles have a content in the toner particles of preferably at least 0.3 parts by mass and no greater than 10.0 parts by mass relative to 100 parts by mass of the toner mother particles, and more preferably at least 0.8 parts by mass and no greater than 2.5 parts by mass.

(Optional External Additive Particles)

The external additive preferably each contains only the specific external additive particles and the silica particles but may further contain optional external additive particles besides the specific external additive particles and the silica particles. Examples of the optional external additive particles include resin particles and inorganic particles other than the specific external additive particles. Examples of the inorganic particles include particles of metal oxides (e.g., titanium oxide, magnesium oxide, and zinc oxide). The total percentage content of the specific external additive particles and the silica particles in the external additive is preferably at least 90% by mass, and further preferably 100% by mass.

(Toner Mother Particles)

The toner mother particles contain a binder resin as a main component, for example. The toner mother particles may further contain an internal additive (e.g., at least one of a colorant, a releasing agent, a charge control agent, and a magnetic powder) as necessary. The toner mother particles may be for example pulverized toner mother particles obtained by pulverization or aggregated toner mother particles obtained by aggregation, and preferably pulverized toner mother particles.

(Binder Resin)

In terms of providing a toner excellent in low-temperature fixability, the toner mother particles preferably contain a thermoplastic resin as the binder resin, and more preferably contain a thermoplastic resin in a proportion of at least 85% by mass of the total binder resin. Examples of the thermoplastic resin include styrene resins, (meth)acrylic acid ester resins, olefin resins (e.g., polyethylene resin and polypropylene resin), vinyl resins (e.g., vinyl chloride resin, polyvinyl alcohol, vinyl ether resin, and N-vinyl resin), polyester resins, polyamide resins, and urethane resins. Alternatively, a copolymer of any of these resins, that is, a copolymer (e.g., styrene-(meth)acrylic acid ester resin or styrene-butadiene-based resin) in which any repeating unit has been introduced into any of the resins can be used as the binder resin.

The binder resin has a percentage content in the toner mother particles of preferably at least 30% by mass and no greater than 55% by mass, and more preferably at least 40% by mass and no greater than 50% by mass.

In terms of optimizing low-temperature fixability of the toner of the present disclosure, the binder resin is preferably a polyester resin. The polyester resin can be obtained by condensation polymerization of at least one polyhydric alcohol and at least one polybasic carboxylic acid. Examples of the polyhydric alcohol for synthesis of the polyester resin include dihydric alcohols (e.g., diol compounds and bisphenol compounds) and tri- or higher-hydric alcohols. Examples of the polybasic carboxylic acid for synthesis of the polyester resin include dibasic carboxylic acids and tri- or higher-basic carboxylic acids. A polybasic carboxylic acid derivative (e.g., a polybasic carboxylic acid anhydride or a polybasic carboxylic acid halide) may be used instead of the polybasic carboxylic acid.

Examples of the diol compounds include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compounds include bisphenol A, hydrogenated bisphenol A, bisphenol A-ethylene oxide adducts (e.g., polyoxyethylene(2,2)-2,2-bis(4-hydroxyphenyl)propane), and bisphenol A propylene oxide adduct.

Examples of the tri- or higher-basic alcohol include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of the di-basic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, alkyl succinic acids (specific examples include n-butylsuccinic acid, isobutylsuccinic acid, n-octylsuccinic acid, n-dodecylsuccinic acid, and isododecylsuccinic acid), and alkenyl succinic acids (specific examples include n-butenylsuccinic acid, isobutenylsuccinic acid, n-octenylsuccinic acid, n-dodecenylsuccinic acid, and isododecenylsuccinic acid).

Examples of the tri- or higher-basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid.

The polyester resin is preferably a condensation polymer of a bisphenol A-ethylene oxide adduct, terephthalic acid, and trimellitic anhydride.

(Magnetic Powder)

Examples of the material of the magnetic powder include ferromagnetic metals (e.g., iron, cobalt, nickel, and alloys containing at least one of these metals), ferromagnetic metal oxides (e.g., ferrite, magnetite, and chromium dioxide), and materials subjected to ferromagnetization (e.g., carbon materials made ferromagnetic by thermal treatment).

The magnetic powder has a content in the toner mother particles of preferably at least 20 parts by mass and no greater than 100 parts by mass relative to 100 parts by mass of the binder resin, and more preferably at least 35 parts by mass and no greater than 65 parts by mass.

The magnetic powder has a number average primary particle diameter of preferably at least 0.1 μm and no greater than 1.0 μm, and more preferably at least 0.1 μm and no greater than 0.3 μm.

The magnetic powder is preferably subjected to surface treatment in terms of inhibiting elution of metal ions (e.g., iron ions) from the magnetic powder. When the metal ions are eluted to the surfaces of the toner mother particles, toner mother particles readily adhere to each other. It is considered that inhibition of elution of the metal ions from the magnetic powder inhibits adhesion of toner mother particles.

(Charge Control Agent)

The toner mother particles may contain a charge control agent. The charge control agent is used for the purpose of providing a toner with excellent charge stability or charge rise characteristics, for example. The charge rise characteristics of the toner serve as an indicator as to whether the toner can be charged to a specific charge level in a short period of time. When the toner mother particles contain a positively chargeable charge control agent, cationicity of the toner mother particles can be increased.

Examples of the positively chargeable charge control agent include azine compounds, direct dyes, acid dyes, alkoxylated amines, alkylamides, quaternary ammonium salt compounds, and resins having a quaternary ammonium cationic group. The charge control agent is preferably a quaternary ammonium salt compound.

Examples of the azine compounds include pyridazine, pyrimidine, pyrazine, 1,2-oxazine, 1,3-oxazine, 1,4-oxiazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline.

Examples of the direct dyes include Azine Fast Red FC, Azine Fast Red 12BK, Azine Violet BO, Azine Brown 3G, Azine Light Brown GR, Azine Dark Green BH/C, Azine Deep Black EW, and Azine Deep Black 3RL.

Examples of the acid dyes include nigrosine BK, nigrosine NB, and nigrosine Z.

Examples of the quaternary ammonium salt compounds include benzyldecylhexylmethyl ammonium chloride, decyltrimethyl ammonium chloride, 2-(methacryloyloxy) ethyl trimethylammonium chloride, and dimethylaminopropyl acrylamide methyl chloride quaternary salt.

In terms of providing a toner with excellent charge stability, the charge control agent has a content of preferably at least 1 part by mass and no greater than 10 parts by mass relative to 100 parts by mass of the binder resin, and more preferably at least 2 parts by mass and no greater than 5 parts by mass.

(Releasing Agent)

The toner mother particles may contain a releasing agent. The releasing agent is used for the purpose of imparting offset resistance to the toner of the present disclosure, for example. In terms of imparting sufficient offset resistance to the toner of the present disclosure, the content of the releasing agent is preferably at least 1 part by mass and no greater than 20 parts by mass relative to 100 parts by mass of the binder resin, and more preferably at least 7 parts by mass and no greater than 13 parts by mass.

Examples of the releasing agent include aliphatic hydrocarbon-based waxes, oxides of aliphatic hydrocarbon-based waxes, plant waxes, animal waxes, mineral waxes, ester waxes containing a fatty acid ester as a main component, and waxes in which a fatty acid ester has been partially or fully deoxidized. Examples of the aliphatic hydrocarbon-based waxes include low molecular weight polyethylene, low molecular weight polypropylene, polyolefin copolymers, polyolefin wax, microcrystalline wax, paraffin wax, and Fischer-Tropsch wax. Examples of the oxides of aliphatic hydrocarbon-based waxes include oxidized polyethylene wax and block copolymers of oxidized polyethylene wax. Examples of the plant waxes include candelilla wax, carnauba wax, Japan wax, jojoba wax, and rice wax. Examples of the animal waxes include beeswax, lanolin, and spermaceti. Examples of the mineral waxes include ozokerite, ceresin, and petrolatum. Examples of the ester waxes containing a fatty acid ester as a main component include montanic acid ester wax and castor wax. Examples of the waxes in which a fatty acid ester has been partially or fully deoxidized include deoxidized carnauba wax. Preferably, the releasing agent is carnauba wax.

When the toner mother particles contain a releasing agent, a compatibilizer may be added to the toner mother particles in order to improve compatibility between the binder resin and the releasing agent.

(Colorant)

The toner mother particles may contain a colorant. The colorant can be a known pigment or dye that matches the color of the toner.

The toner mother particles may contain a black colorant. Carbon black can be used as the black colorant. Alternatively, a colorant can be used that has been adjusted to a black color using colorants such as a yellow colorant, a magenta colorant, and a cyan colorant. The magnetic powder may be used as the black colorant. That is, the toner mother particles may not contain a colorant other than the magnetic powder.

Second Embodiment: Toner Production Method

A toner production method according to a second embodiment of the present disclosure is a method for producing a toner containing toner particles each including a toner mother particle and an external additive attached to the surface of the toner mother particle. The toner production method includes: preparing specific external additive particles; and externally adding the external additive to the toner mother particles. The specific external additive particles each include an aluminum oxide particle and a coat layer covering the surface of the aluminum oxide particle. The coat layers contain antimony tin oxide particles. In the preparing specific external additive particles, the coat layers are formed by precipitating the antimony tin oxide particles on the surfaces of the aluminum oxide particles in a reaction solution. The reaction solution contains a basic ammonium salt. The reaction solution has a pH of at least 4.2 and no greater than 5.8.

The toner production method of the present disclosure is favorable as a method for producing the toner according to the first embodiment. Preferably, the toner production method of the present disclosure further includes preparing the aforementioned toner mother particles. However, commercially available toner mother particles may be directly used in the externally adding the external additive in the toner production method of the present disclosure.

[Preparing Specific External Additive Particles]

In the present process, the specific external additive particles are prepared.

Specifically, in the present process, antimony tin oxide particles are allowed to precipitate on the surfaces of the aluminum oxide particles in a reaction solution to form the coat layers.

The reaction solution used in the present process contains a basic ammonium salt. In the present process, the pH of the reaction solution is adjusted by using the basic ammonium salt to cause a precipitation reaction by which the antimony tin oxide particles are deposited on the surfaces of the aluminum oxide particles.

In the present process, the precipitation reaction can proceed for example by dripping an acid solution and a neutralizer containing the basic ammonium salt in parallel into a water dispersion containing the aluminum oxide particles. The acid solution contains a tin compound (e.g., stannic chloride pentahydrate) and an antimony compound (e.g., antimony trichloride).

The pH of the reaction solution (a mixed liquid of the water dispersion, the acid solution, and the neutralizer in the above example) is at least 4.2 and no greater than 5.8, and preferably at least 4.7 and no greater than 5.3. As a result of the pH of the reaction solution being set to at least 4.2, the precipitation reaction can be promoted. As a result of the pH of the reaction solution being set to no greater than 5.8, rapid progress of the precipitation reaction can be suppressed. Note that the pH of the reaction solution can be adjusted by changing the rate of addition of the neutralizer.

It is important in the precipitation reaction to adjust the pH within the above range and use the basic ammonium salt being a weak based as the neutralizer. The lowest solubility of tin oxide, $Sn(OH)_2$ is around pH 4. The lowest solubility of antimony oxide, $Sb_2O_3$, is around pH 6. Therefore, antimony tin oxide slowly precipitates by setting the pH of the reaction solution to at least 4.2 and no greater than 5.8. In a slow precipitation reaction such as above, antimony tin oxide precipitates in a significantly fine particle shape. As such, coat layers formed by such a slow precipitation reaction each are a layer of condensed antimony tin oxide particles. Here, when a strong base such as sodium hydroxide is used as the neutralizer, antimony tin oxide quickly precipitates with a coprecipitation reaction with sodium ions. The antimony tin oxide under such a quick precipitation reaction does not form fine particles, but precipitates in uniform coating. As such, the arithmetic mean roughness Ra of the surfaces of the specific external additive particles tends to be less than 8 nm when prepared by such a quick precipitation reaction.

Examples of the basic ammonium salt include ammonium hydroxide, ammonium bicarbonate, and ammonium carbonate. The basic ammonium salt is preferably ammonium hydroxide or ammonium bicarbonate.

The reaction temperature of the precipitation reaction is preferably at least 50° C. and no greater than 90° C., and more preferably at least 60° C. and no greater than 80° C. The reaction time is preferably at least 30 minutes and no greater than 6 hours.

In the present process, the molar ratio of the amount of the antimony element used to the amount of the tin element used is preferably at least 0.8 and no greater than 2.5, and more preferably at least 1.5 and no greater than 2.0. As a result of the above molar ratio being set to at least 0.8 and no greater than 2.5, favorable conductivity can be easily imparted to the specific external additive particles formed.

In the present process, washing, drying, baking, and pulverization are preferably carried out in the stated order on the specific external additive particles obtained by the precipitation reaction. In the washing, the specific external additive particles are washed with for example ion exchange water. In the drying, the specific external additive particles after the washing are dried. The drying conditions include a drying temperature of at least 100° C. and no greater than 150° C. and a drying time of at least 4 hours and no greater than 24 hours, for example. In the baking, the specific external additive particles after the drying are baked by heating using for example an electric furnace. The baking conditions may include a baking temperature of at least 300° C. and no greater than 600° C. and a baking time of at least 30 minutes and no greater than 5 hours. In the pulverization, the specific external additive particles after the baking are pulverized using for example a pulverizer.

[Preparing Toner Mother Particles]

In the present process, the toner mother particles are prepared by an aggregation method or a pulverization method, for example.

The aggregation method includes an aggregation process and a coalescence process, for example. The aggregation process includes causing fine particles containing a component constituting the toner mother particles in an aqueous medium to aggregate to form aggregated particles. The coalescence process includes causing the components contained in the aggregated particles to coalesce in the aqueous medium to form the toner mother particles.

The pulverization method is described next. According to the pulverization method, the toner mother particle can be relatively easily prepared and manufacturing cost can be reduced. In preparation of the toner mother particles by the pulverization method, the preparing toner mother particles includes melt-kneading and pulverizing, for example. The preparing toner mother particles may further include mixing prior to the melt-kneading. Alternatively or additionally, the preparing toner mother particles may further include at least one of finely pulverizing and classifying after the pulverizing.

In the mixing, the binder resin and an internal additive added as necessary are mixed to yield a mixture. In the melt-kneading, toner materials are melted and kneaded to yield a melt-kneaded product. The toner material may be the mixture yielded in the mixing, for example. In the pulverizing, the yielded melt-kneaded product is cooled for example to room temperature (25° C.) and pulverized then to obtain a pulverized product. When it is necessary to reduce the diameter of the pulverized product obtained in the pulverizing, a process of further pulverizing (finely pulverizing) the pulverized product may be carried out. Additionally, when it is necessary to average the particle diameter of the pulverized product, a process (classification process) of classifying the pulverized product may be carried out. Through the above processes, the toner mother particles being the pulverize product were obtained.

[Externally Adding External Additive]

In the externally adding the external additive, the toner mother particles and an external additive containing the specific external additive particles are mixed using a mixer to attach the external additive to the surfaces of the toner mother particles. Thus, the toner is obtained. An example of the mixer is an FM mixer (product of Nippon Coke & Engineering Co., Ltd.).

EXAMPLES

The following provides more specific description of the present disclosure through use of Examples. However, the present disclosure is not limited to the scope of Examples.

[Specific External Additive Particle Preparation]

Specific external additive particles (A-1) to (A-13) were prepared by the following methods. The following indicates details of aluminum oxide particles used in preparation of the specific external additive particles.

(Aluminum Oxide Particles)

Aluminum oxide particles (AKP-20): "AKP-20" produced by SUMITOMO CHEMICAL COMPANY, LIMITED, center particle diameter 0.42 μm Aluminum oxide particles (AKP-15): "AKP-15" produced by SUMITOMO CHEMICAL COMPANY, LIMITED, center particle diameter 0.60 μm Aluminum oxide particles (AKP-53): "AKP-53" produced by SUMITOMO CHEMICAL COMPANY, LIMITED, center particle diameter 0.17 μm Aluminum oxide particles (AKP-50): "AKP-50" produced by SUMITOMO CHEMICAL COMPANY, LIMITED, center particle diameter 0.20 μm Aluminum oxide particles (particle size adjusted product): particle size adjusted product of "AKP-15" produced by SUMITOMO CHEMICAL COMPANY, LIMITED, volume median diameter 600 nm The above aluminum oxide particles (particle size adjusted product) were prepared by the following method. The above aluminum oxide particles (AKP-15) ("AKP-15", product of SUMITOMO CHEMICAL COMPANY, LIMITED) were classified using a classifier ("ELBOW-JET (registered Japanese trademark) AIR CLASSIFIER", product of MATSUBO Corporation). Through the classification, aluminum oxide particles with small particle diameters were removed from the aluminum oxide particles (AKP-15). The resulting aluminum oxide particles were taken as the aluminum oxide particles (particle size adjusted product). In the classification, the classifier was set to give the volume median diameter of the aluminum oxide particles (particle size adjusted product) 600 nm.

(Specific External Additive Particles (A-1))

A mixed liquid was yielded by mixing 2 L of water and 100.0 g of the aluminum oxide particles (AKP-50). Dispersion treatment was carried out on the resulting mixed liquid using a mixer ("HOMOMIXER MARK II TYPE 2.5", product of PRIMIX Corporation) to disperse the aluminum oxide particles in the water. Thus, a water dispersion (X) was yielded. Next, the water dispersion (X) was charged into a reaction vessel. Next, the water dispersion (X) was heated to 70° C. Separately, 421.0 g of stannic chloride pentahydrate ($SnCl_4 \cdot 5H_2O$) and 91.0 g of antimony trichloride ($SbCl_3$) were dissolved in 1 L of 2.4N hydrochloric acid. Thus, an acid solution (Y) was yielded.

The acid solution (Y) and ammonium hydroxide (ammonia concentration: 1 mol/L) as a neutralizer were dripped in parallel into the water dispersion (X) at 70° C., in the reaction vessel over 2 hours (parallel dripping). In the parallel dripping, the temperature of the contents of the reaction vessel was kept at 70° C. In the parallel dripping, the amount of the neutralizer dripped was adjusted to maintain the pH of the contents of the reaction vessel within a range of at least 4.4 and no greater than 4.6.

After the parallel dripping, the contents (suspension) of the reaction vessel were filtered to obtain a residue. A Buchner funnel with a capacity of 2 L, a funnel (product of Asahi Glassplant Inc.) with a capacity of 1.1 L, and filter paper ("No. 131", product of ADVANTEC TOYO KAISHA, LTD.) were used in the filtration. Next, the residue was washed (washing) by purring 1 L of water in the residue on the filter paper. The conductivity of the filtrate (water after the washing) was measured (conductivity measurement) using a conductivity meter ("ES-51", product of HORIBA, Ltd.). When the conductivity of the filtrate was at least 10 μS/cm, the washing and the conductivity measurement were repeated until the conductivity thereof became less than 10 μS/cm. Through the above, a residue after the washing was obtained. Next, the residue after the washing was dried at 120° C. for 12 hours to yield a dry powder. Next, the dry powder was baked at 500° C. for 2 hours using an electric furnace.

Thereafter, the baked dry powder was pulverized using a pulverizer ("CPY+DSF", product of Nippon Pneumatic Mfg. Co., Ltd., collision plate type supersonic jet mill). In the pulverization, a ceramic flat plate was used as a collision plate, the material feeding speed was set to 6.0 kg/h, and the pulverization pressure was set to 0.5 MPa. Through the above, specific external additive particles (A-1) were obtained.

(Specific External Additive Particles (A-2) to (A-14))

Specific external additive particles (A-2) to (A-14) were prepared according to the same method as that for preparing the specific external additive particles (A-1) in all aspects other than the following changes. In the preparation of the specific external additive particles (A-2) to (A-14), the type of the aluminum oxide particles used, the amounts of stannic chloride pentahydrate ($SnCl_4 \cdot 5H_2O$) and antimony trichloride ($SbCl_3$) used, the type of the neutralizer used in the parallel dripping, and the pH range in the parallel dripping were changed to those shown below in Table 1. Note that in the table below, $NH_4CO_3$ under "Neutralizer" refers to use of an ammonium bicarbonate aqueous solution (ammonium bicarbonate concentration: 1.0 mol/L) as a base. NaOH under "Neutralizer" refers to use of an NaOH aqueous solution (NaOH concentration: 0.5 mol/L) as the neutralizer.

The specific external additive particles (A-1) to (A-14) were observed using an electron microscope. The observation revealed that the antimony tin oxide particles formed layers as the coat layers of the specific external additive particles (A-1) to (A-10), (A-13), and (A-14). The coat layers of the specific external additive particles (A-11) to (A-12) were uniform coat film with a smooth surface in which the antimony tin oxide did not form particles.

TABLE 1

| | Aluminum oxide particles | Amount of use [g] $SnCl_4 \cdot 5H_2O$ | Amount of use [g] $SbCl_3$ | Neutralizer | pH Lower limit | pH Upper limit |
|---|---|---|---|---|---|---|
| A-1 | AKP-20 | 421 | 91 | Ammonium hydroxide | 4.4 | 4.6 |
| A-2 | AKP-20 | 421 | 91 | Ammonium hydroxide | 5.4 | 5.6 |
| A-3 | AKP-20 | 421 | 91 | Ammonium hydroxide | 4.7 | 4.9 |
| A-4 | AKP-20 | 421 | 91 | Ammonium hydroxide | 4.9 | 5.1 |
| A-5 | AKP-15 | 421 | 91 | Ammonium hydroxide | 4.9 | 5.1 |
| A-6 | AKP-53 | 421 | 91 | Ammonium hydroxide | 4.9 | 5.1 |
| A-7 | AKP-50 | 421 | 91 | Ammonium hydroxide | 4.9 | 5.1 |
| A-8 | AKP-20 | 421 | 91 | $NH_4HCO_3$ | 4.9 | 5.1 |
| A-9 | AKP-20 | 421 | 91 | Ammonium hydroxide | 3.9 | 4.1 |
| A-10 | AKP-20 | 421 | 91 | Ammonium hydroxide | 5.9 | 6.1 |
| A-11 | AKP-20 | 421 | 91 | NaOH | 4.4 | 4.6 |
| A-12 | AKP-20 | 421 | 91 | NaOH | 5.4 | 5.6 |

TABLE 1-continued

| | Aluminum oxide particles | Amount of use [g] SnCl$_4$•5H$_2$O | SbCl$_3$ | Neutralizer | pH Lower limit | pH Upper limit |
|---|---|---|---|---|---|---|
| A-13 | AKP-20 | 421 | 22 | Ammonium hydroxide | 4.9 | 5.1 |
| A-14 | Particle size adjusted product | 421 | 91 | Ammonium hydroxide | 4.9 | 5.1 |

Note that in the preparation of the specific external additive particles (A-1) to (A-12) and (A-14), the molar ratio of the amount of the antimony element used to the amount of the tin element used was 1.7. In the preparation of the specific external additive particles (A-13), the molar ratio of the amount of the antimony element used to the amount of the tin element used was 0.4.

[Property Measurement]

The volume median diameter ($D_{50}$), arithmetic mean surface roughness Ra, and powder specific resistance of each type of the specific external additive particles (A-1) to (A-14) were measured by the following methods. The measurement results are as shown below in Table 2.

[Measurement of Volume Median Diameter ($D_{50}$)]

Mixing of 0.5 parts by mass of a measurement target (any of the specific external additive particles (A-1) to (A-14)) and 99.5 parts by mass of methanol were carried out. Ultrasonication (at 100 kHz) was carried out on the resulting mixed liquid for 10 minutes. Thus, a dispersion (measurement target concentration: 0 5% by mass) containing the measurement target was yielded. The volume median diameter of the measurement target contained in the dispersion was measured using a laser diffraction/scanning particle size distribution analyzer ("LA-920V2, product of HORIBA, Ltd.).

(Measurement of Arithmetic Mean Roughness Ra)

Using a tablet forming presser ("BRE-33", product of MAEKAWA TESTING MACHINE MFG. Co., Ltd.), the measurement target (any of the specific external additive particles (A-1) to (A-14)) was press formed (pressure: 100 kg/cm$^2$) into a columnar pellet with a diameter of 10 mm. The arithmetic mean roughness Ra of the surface of the columnar pellet was measured under the following measurement conditions using a scanning probe microscope ("S-IMAGE", product of Hitachi High-Tech Science Corporation). In detail, a contour image of the columnar pellet was obtained using the scanning probe microscope. Next, third order tilt correction was carried out on the contour image. Next, an arithmetic mean roughness Ra of the surface of the columnar pellet was measured based on the corrected contour image using a surface roughness analysis profile. Measurement of the arithmetic mean roughness Ra was carried out at 5 randomly selected locations on the surface of the columnar pellet, and the average value of the results of the 5 measurements was taken as the arithmetic mean roughness Ra of the surfaces of the measurement target (n=5).

(Measurement Conditions)

Cantilever: SI-DF40

Measurement mode: AFM

Scanning area: 1000 nm

Number of pieces of XY coordinate data: 512

(Measurement of Powder Specific Resistance)

Using the aforementioned tablet forming presser, the measurement target (any of the specific external additive particles (A-1) to (A-14)) was press formed (pressure: 100 kg/cm$^2$) into a columnar pellet with a diameter of 10 mm. The electric resistance of the columnar pellet was measured using a digital multimeter ("DM7560", product of Yokogawa Test & Measurement Corporation). The measured electric resistance was converted into a specific resistance based on the shape of the columnar pellet. The converted specific resistance was taken as a powder specific resistance of the measurement target.

TABLE 2

| | Volume median diameter [nm] | Arithmetic mean roughness Ra [nm] | Powder specific resistance [Ω · cm] |
|---|---|---|---|
| A-1 | 430 | 40 | 28 |
| A-2 | 421 | 10 | 12 |
| A-3 | 425 | 30 | 21 |
| A-4 | 424 | 24 | 18 |
| A-5 | 500 | 27 | 19 |
| A-6 | 190 | 20 | 22 |
| A-7 | 210 | 22 | 20 |
| A-8 | 425 | 21 | 17 |
| A-9 | 431 | 50 | 31 |
| A-10 | 422 | 5 | 8 |
| A-11 | 426 | 5 | 12 |
| A-12 | 427 | 5 | 13 |
| A-13 | 422 | 22 | 105 |
| A-14 | 608 | 20 | 29 |

[Polyester Resin Synthesis]

A reaction vessel was charged with 1.0 mol of polyoxyethylene(2,2)-2,2-bis(4-hydroxyphenyl)propane, 4.5 mol of terephthalic acid, 0.5 mol of trimellitic anhydride, and 4 g of dibutyltin oxide. The contents of the reaction vessel were caused to react at 230° C. for 8 hours in a nitrogen atmosphere. Thereafter, unreacted components in the reaction vessel were distilled off under reduced pressure by reducing the air pressure in the reaction vessel to 8.3 kPa. Thereafter, the contents (polyester resin) of the reaction vessel were washed and dried. Through the above, a polyester resin with a softening point of 120° C. was obtained. The resulting polyester resin was used as a binder resin.

[Toner Mother Particle Preparation]

Using an FM mixer ("FM-20B", product of Nippon Coke & Engineering Co., Ltd.), 100 parts by mass of the above-described polyester resin as the binder resin, 50 parts by mass of a magnetic powder ("MRO-15A", product of TODA KOGYO CORP., component: magnetite) as a colorant, 10 parts by mass of a carnauba wax ("CARNAUBA WAX No. 1", product of S. Kato & Co.) as a releasing agent, and 3 parts by mass of a quaternary ammonium salt compound ("FCA 210PS", product of Fujikura Kasei Co., Ltd.) as a charge control agent were mixed at a rotational speed of 200 rpm for 4 minutes. Thereafter, the resulting mixture was melt-kneaded at 150° C. using a twin screw extruder ("TEM 45", product of former TOSHIBA MACHINE CO., LTD.). The kneaded product obtained through the above was subsequently cooled. The cooled kneaded product was coarsely pulverized using a FEATHER MILL (registered Japanese trademark) ("MODEL 350×600", product of Hosokawa Micron Corporation). The resulting coarsely pulverized product was finely pulverized using an airflow pulverizer ("JET MILL MODEL IDS-2", product of Nippon Pneumatic Mfg. Co., Ltd.). The resulting finely pulverized product was classified using an elbow jet classifier ("ELBOW JET MODEL EJ-LABO", product of Nittetsu Mining Co., Ltd.). Through the above, toner mother particles with a volume median diameter of 7 μm were obtained. Note that the volume median diameter of the toner mother particles was measured using a particle size meter ("COULTER COUNTER MULTISIZER 3", product of Beckman Coulter, Inc.).

<Toner Preparation>

Toners of Examples 1 to 11 and Comparative Examples 1 to 7 were prepared by the following methods.

Example 1

Using an FM mixer ("FM-10", product of Nippon Coke & Engineering Co., Ltd.), 100.0 parts by mass of the above-described toner mother particles, 1.5 parts by mass of positively chargeable silica particles ("AEROSIL (registered Japanese trademark) REA90", product of NIPPON AEROSIL CO., LTD., dry silica particles with positive chargeability imparted through surface treatment, number average primary particle diameter 20 nm) as an external additive, and 1.0 part by mass of the specific external additive particles (A-1) were mixed. Next, the resulting mixture was sifted using a vibrating electric sieve ("ANF-30", product of NITTO KAGAKU CO., Ltd.) and a 200-mesh sieve (opening 75 μm). Thus, a toner (one-component magnetic developer) of Example 1 was obtained.

Examples 2 to 11 and Comparative Examples 1 to 7

Toners of Examples 2 to 11 and Comparative Examples 1 to 7 were prepared according to the same method as that for preparing the toner of Example 1 in all aspects other than that the type and amount of the specific external additive particles used were changed to those shown below in Table 3. Note that the aluminum oxide particles (AKP-20) were used instead of the specific external additive particles in the preparation of the toner of Comparative Example 7.

[Measurement of Detachment Rate of Specific External Additive Particles]

With respect to each of the toners of Examples 1 to 11 and Comparative Examples 1 to 7, the detachment rate of the specific external additive particles was measured by the following method. The measurement results are shown below in Table 3.

Mixing was carried out of 0.2 g of a nonionic surfactant ("EMULGEN (registered Japanese trademark) 120", product of Kao Corporation, component: polyoxyethylene lauryl ether), 80.0 g of ion exchange water, and 20.0 g of a measurement target (any of the toners of Examples 1 to 11 and Comparative Examples 1 to 7) to yield a toner dispersion. Ultrasonication was carried out on the resulting toner dispersion for 5 minutes using an ultrasonic disperser ("ULTRASONIC MINI WELDER P128", product of ULTRASONIC ENGINEERING CO., LTD., output power: 100 W, oscillation frequency: 28 kHz). Subsequently, the toner dispersion having been subjected to ultrasonication was suction filtered (suction filtration) using a Buchner funnel and quantitative filter paper. Thereafter, re-slurrying by adding 50 mL of ion exchange water to the residue and the aforementioned suction filtration were repeated 5 times (washing). After the washing, the residue was sufficiently dried. The dried residue was taken as a post-ultrasonication measurement target.

Next, fluorescent X-ray analysis was carried out to measure a peak intensity $X_A$ of the aluminum element contained in the post-ultrasonication measurement target and a peak intensity $X_B$ of the aluminum element contained in the measurement target before the ultrasonication. A detachment rate of the specific external additive particles in the measurement target was calculated using the following formula. The fluorescent X-ray analysis was carried out as follows.

$$\text{Detachment rate} = 100 \times (X_B - X_A)/X_B$$

(Fluorescent X-Ray Analysis)

Using the aforementioned tablet forming presser, 1.5 g of a fluorescent X-ray analysis target (measurement target before ultrasonication or post-ultrasonication measurement target) was press formed (pressure: 20 MPa, pressing time: 3 seconds) into a columnar pellet with a diameter of 30 mm. Fluorescent X-ray analysis was carried out on the resulting pellet under the following conditions to plot a X-ray fluorescence spectrum (horizontal axis: energy, vertical axis: intensity (number of photons) including a peak derived from the aluminum element.

(Conditions for Fluorescent X-Ray Analysis)

Analyzer: scanning fluorescent X-ray analyzer ("ZSX PRIMUS IV", product of Rigaku Corporation)

Spectroscopic crystal: RX35, RX45

<Evaluation>

With respect to each of the toners of Examples 1 to 11 and Comparative Examples 1 to 7, developability and image density and fogging of formed images were evaluated by the following methods. Each evaluation was carried out under conditions of a temperature of 23° C. and a relative humidity of 50%. Evaluation results are shown below in Table 3.

[Evaluation Apparatus]

As an evaluation apparatus, a monochrome printer (ECOSYS (registered Japanese trademark) FS-P3060DN", product of KYOCERA Document Solutions Japan Inc.) was used. An evaluation target (any of the toners of Examples 1 to 11 and Comparative Examples 1 to 7) was loaded into a development device of the evaluation apparatus. A toner (any of the toners of Examples 1 to 11 and Comparative Examples 1 to 7) for replenishment use was also loaded into a toner container of the evaluation apparatus. A4-size paper ("MULTIPAPER SUPER ECONOMY (registered Japanese trademark) A4", product of ASKUL Corporation) was used as printing paper.

[Printing]

Using the evaluation apparatus, a character document (printing rate 1%) was printed on both sides of 5000 sheets of the printing paper. Thereafter, an image density evaluation image including a solid image (printing rate 100%) was printed on one sheet of the printing paper as an image density evaluation sheet. Next, a white image (printing rate 0%) was printed on one sheet of the printing paper as a fog evaluation sheet.

[Developability]

After printing the aforementioned fog evaluation sheet, the development device was taken out of the evaluation apparatus and a toner thin layer formed on the toner bearing member (development sleeve) was observed. The presence or absence of anomaly (e.g., toner clogging, streaks, or adhesives) in the outer appearance of the toner thin layer was checked. Next, the toner thin layer on the development sleeve was sucked using a compact toner draw-off charge measurement system ("MODEL 210HS-1", product of TREK, INC.). Thus, the mass of the toner constituting the toner thin layer on the development sleeve was quantified. A mass M of toner sucked by the compact toner draw-off charge measurement system was divided (M/A) by an area A of the sucked development sleeve to obtain a mass of the toner per unit area of the development sleeve (also referred to below as toner transport amount). Developability was evaluated according to the following criteria based on the toner transport amount.

[Fogging]

Using a fully automatic brightness meter ("TC-6DSA", product of Tokyo Denshoku Co., Ltd.), an image density ($ID_A$) of the white image on the aforementioned fogging evaluation sheet and an image density ($ID_B$) of a non-used sheet of the printing paper were measured. A value ΔID ($ID_A$−$ID_B$) obtained by subtracting $ID_B$ from $ID_A$ was calculated. Fogging was evaluated according to the following criteria based on ΔID.

(Criteria of Fogging)

A (very good): ΔID of less than 0.010

B (good): ΔID of at least 0.010 and less than 0.020

C (poor): ΔID of 0.02 or more

TABLE 3

| Toner | Specific external additive particles: Type | Specific external additive particles: Part by mass | Specific external additive particles: Detachment rate [%] | Evaluation: Developability: Transport amount [g/m²] | Evaluation: Developability: Rating | Evaluation: Image density: ID | Evaluation: Image density: Rating | Evaluation: Fogging: ΔID | Evaluation: Fogging: Rating |
|---|---|---|---|---|---|---|---|---|---|
| Example 1 | A-1 | 1.0 | 50 | 6.5 | A | 1.32 | A | 0.011 | B |
| Example 2 | A-2 | 1.0 | 15 | 3.5 | B | 1.30 | A | 0.004 | A |
| Example 3 | A-3 | 1.0 | 42 | 5.6 | A | 1.31 | A | 0.009 | A |
| Example 4 | A-4 | 1.0 | 21 | 4.8 | A | 1.32 | A | 0.006 | A |
| Example 5 | A-5 | 1.0 | 45 | 8.2 | B | 1.19 | B | 0.016 | B |
| Example 6 | A-6 | 1.0 | 11 | 3.2 | B | 1.34 | A | 0.002 | A |
| Example 7 | A-7 | 1.0 | 15 | 4.3 | A | 1.33 | A | 0.004 | A |
| Example 8 | A-1 | 0.5 | 10 | 3.8 | B | 1.29 | B | 0.012 | B |
| Example 9 | A-1 | 3.0 | 43 | 8.1 | B | 1.24 | B | 0.015 | B |
| Example 10 | A-1 | 2.0 | 33 | 7.0 | A | 1.32 | A | 0.009 | A |
| Example 11 | A-8 | 1.0 | 23 | 5.0 | A | 1.30 | A | 0.007 | A |
| Comparative Example 1 | A-9 | 1.0 | 60 | 2.8 | B | 1.02 | C | 0.022 | C |
| Comparative Example 2 | A-10 | 1.0 | 18 | Streaks observed | C | 1.11 | B | 0.015 | B |
| Comparative Example 3 | A-11 | 1.0 | 12 | Streaks observed | C | 1.16 | B | 0.013 | B |
| Comparative Example 4 | A-12 | 1.0 | 14 | Streaks observed | C | 1.18 | B | 0.014 | B |
| Comparative Example 5 | A-13 | 1.0 | 19 | 5.8 | A | 0.65 | C | 0.021 | C |
| Comparative Example 6 | A-14 | 1.0 | 70 | 8.3 | B | 1.12 | B | 0.026 | C |
| Comparative Example 7 | AKP-20 | 1.0 | 10 | Streaks observed | C | 0.98 | C | 0.030 | C |

(Criteria of Developability)

A (very good): No anomaly was recognized on the outer appearance of the toner thin layer. The transport amount was at least 4 g/m² and no greater than 8 g/m².

B (good): No anomaly was recognized on the outer appearance of the toner thin layer. The transport amount was less than 4 g/m² or greater than 8 g/m².

C (poor): Anomaly was recognized on the outer appearance of the toner thin layer.

[Image Density]

Image density (ID) of the solid image on the aforementioned image density evaluation sheet was measured using a fully automatic brightness meter ("TC-6DSA", product of Tokyo Denshoku Co., Ltd.). Image density was evaluated according to the following criteria based on the measured ID.

(Criteria of Image Density)

A (very good): ID of at least 1.30

B (good): ID of at least 1.10 and less than 1.30

C (poor): ID of less than 1.10

Each of the toners of Examples 1 to 11 contained toner particles. The toner particles each included a toner mother particle and an external additive attached to the surface of the toner mother particle. The external additive contained specific external additive particles. The specific external additive particles each included an aluminum oxide particle and a coat layer covering the surface of the aluminum oxide particle. The coat layer contained antimony tin oxide particles. The specific external additive particles had a powder specific resistance of no greater than 100 Ω·cm. The specific external additive particles had a volume median diameter of at least 100 nm and no greater than 550 nm. The specific external additive particles had surfaces with an arithmetic mean roughness Ra of at least 8 nm and no greater than 45 nm. The specific external additive particles had a content of at least 0.3 parts by mass and no greater than 4.0 parts by mass relative to 100 parts by mass of the toner mother particles. The toners of Examples 1 to 11 were excellent in developability, formed images with desired image density, and inhibited occurrence of fogging.

By contrast, the specific external additive particles of the toner of Comparative Examples 1 had surfaces with an arithmetic mean roughness Ra of greater than 45 nm. It is considered in the toner of Comparative Example 1 that due to the small contact area between the specific external additive particles and the toner mother particles, the specific external additive particles are easily detached from the toner mother particles, resulting in charge failure. As a result, the toner of Comparative Example 1 was rated as poor in fogging and image density of formed images.

The specific external additive particles of each of the toner of Comparative Examples 2 to 4 had surfaces with an arithmetic mean roughness Ra of less than 8 nm. It is considered in the toners of Comparative Examples 2 to 4 that the toner particles receive pressure from their surroundings in toner thin film formation on the development sleeve to increase friction resistance. As a result, any of the toner of Comparative Examples 2 to 4 did not form uniform toner thin film on the development sleeve to be rated as poor in developability.

The specific external additive particles of the toner of Comparative Example 5 had a powder specific resistance of greater than 100 Ω·cm. Due to low conductivity of the specific external additive particles, the toner particle are considered to tend to be excessively charged in the toner of Comparative Example 5. As a result, the toner of Comparative Example 5 was rated as poor in fogging and image density of formed images.

The specific external additive particles of the toner of Comparative Example 6 had a volume median diameter of greater than 550 nm. The specific external additive particles of the toner of Comparative Example 6 are considered to tend to be easily detached from the toner mother particles. As a result, the toner of Comparative Example 6 was rated as poor in fogging and image density of formed images.

In the toner of Comparative Example 7, aluminum oxide particles were used instead of the specific external additive particles. Due to extremely low conductivity of the aluminum oxide particles, the toner particles of the toner of Comparative Example 7 are considered to tend to be more excessively charged than those of the toner of Comparative Example 5. As a result, the toner of Comparative Example 7 was rated as poor in fogging and image density of formed images as well as developability.

What is claimed is:

1. A toner comprising:

toner particles, wherein the toner particles each include a toner mother particle and an external additive attached to a surface of the toner mother particle, the external additive contains specific external additive particles, the specific external additive particles each include an aluminum oxide particle and a coat layer covering a surface of the aluminum oxide particle, the coat layers contain antimony tin oxide particles, the specific external additive particles have a powder specific resistance of no greater than 100 Ω·cm, the specific external additive particles have a volume median diameter of at least 100 nm and no greater than 550 nm, the specific external additive particles have surfaces with an arithmetic mean roughness Ra of at least 8 nm and no greater than 45 nm, and the specific external additive particles have a content of at least 0.3 parts by mass and no greater than 4.0 parts by mass relative to 100 parts by mass of the toner mother particles.

2. The toner according to claim 1, wherein the toner is used as a one-component magnetic developer.

3. The toner according to claim 1, wherein the coat layers each contain only the antimony tin oxide particles.

4. The toner according to claim 1, wherein the volume median diameter of the specific external additive particles is at least 350 nm and no greater than 460 nm.

5. The toner according to claim 1, wherein the powder specific resistance of the specific external additive particles is at least 10 Ω·cm and no greater than 30 Ω·cm.

6. A toner production method for producing a toner containing toner particles each including a toner mother particle and an external additive attached to a surface of the toner mother particle, the method comprising:

preparing specific external additive particles; and externally adding the external additive to the toner mother particles, wherein the specific external additive particles each include an aluminum oxide particle and a coat layer covering a surface of the aluminum oxide particle, the coat layers contain antimony tin oxide particles, in the preparing specific external additive particles, the coat layers are formed by precipitating the antimony tin oxide particles on the surfaces of the aluminum oxide particles in a reaction solution, the reaction solution contains a basic ammonium salt, and the reaction solution has a pH of at least 4.2 and no greater than 5.8.

7. The toner production method according to claim 6, wherein the basic ammonium salt includes ammonium hydroxide or ammonium bicarbonate.

* * * * *